United States Patent Office 2,803,307
Patented Aug. 20, 1957

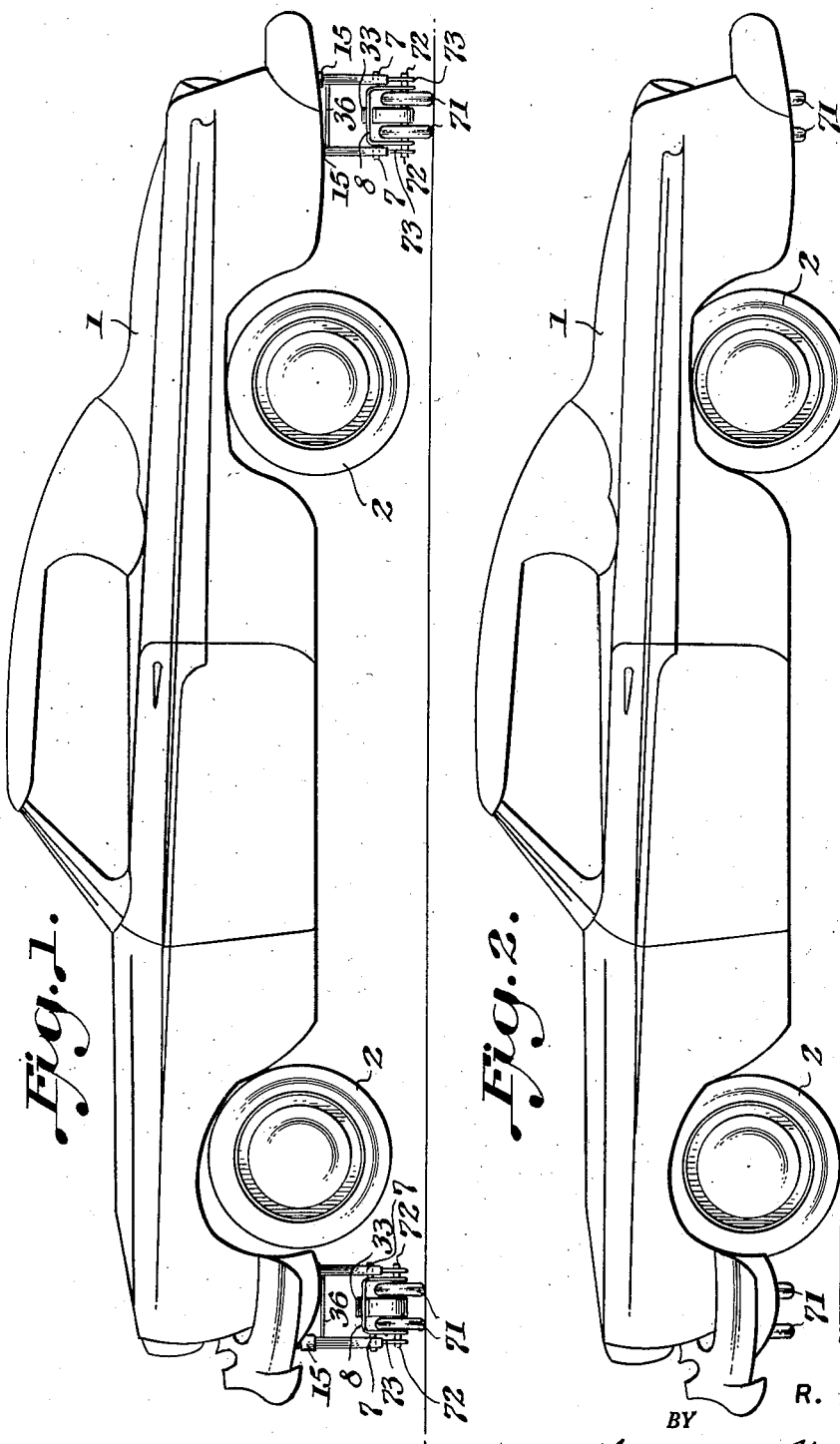

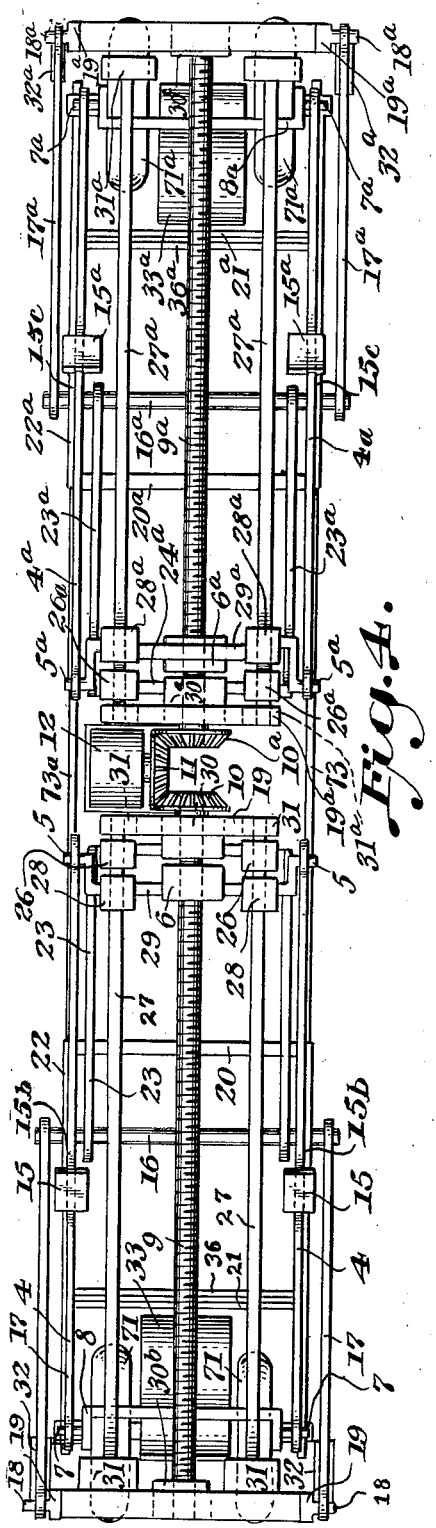
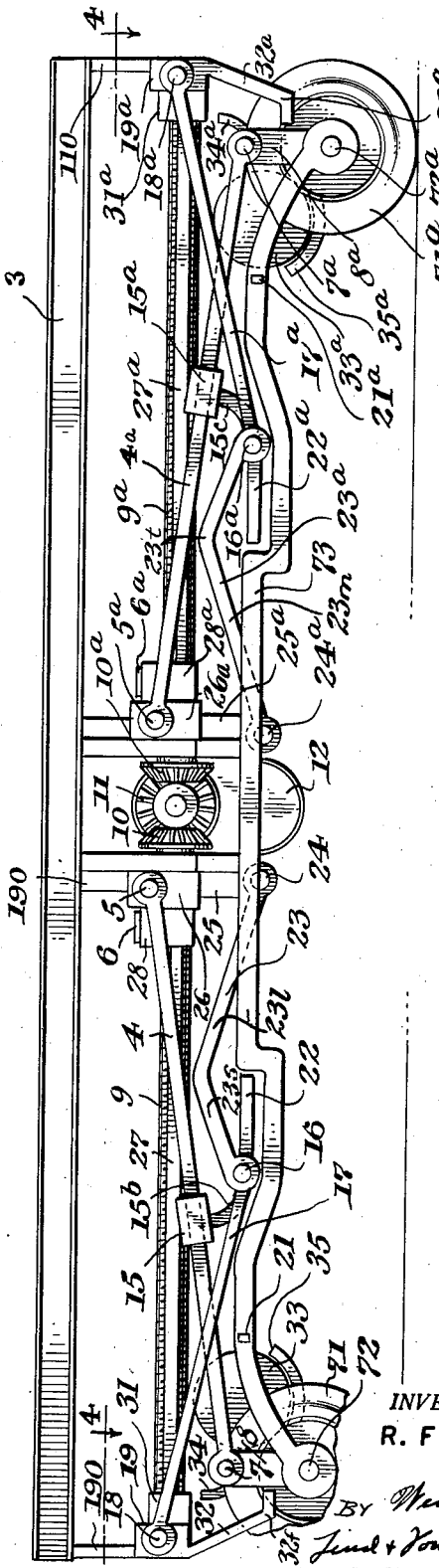
Fig. 4.
Fig. 3.
INVENTOR.
R. FERRER

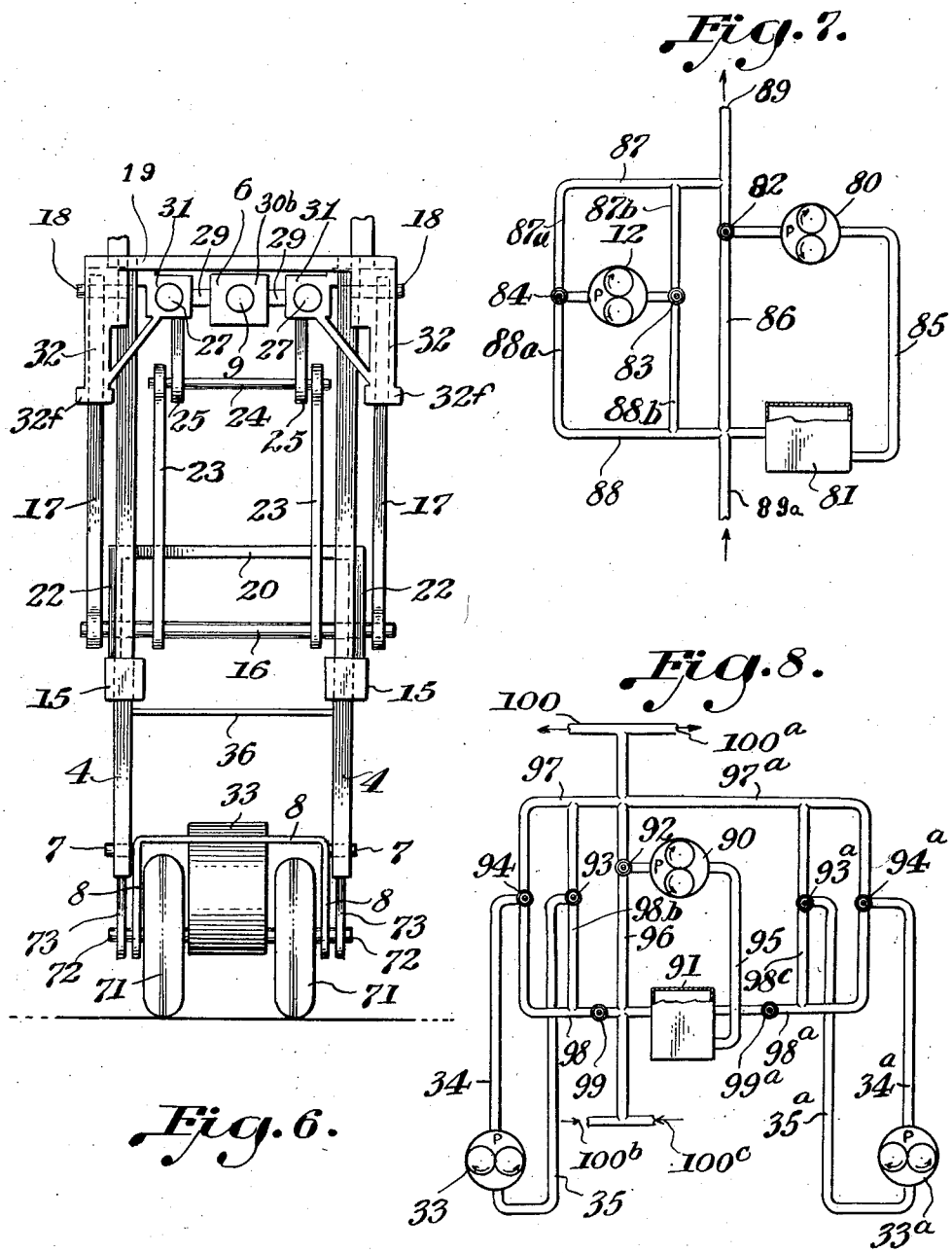

2,803,307

VEHICLE PARKING DEVICE

Raimundo Ferrer, Marianao, Cuba

Application November 16, 1955, Serial No. 547,272

6 Claims. (Cl. 180—1)

The present invention relates to a device for installation beneath the front and rear ends of a vehicle chassis to facilitate parking in small spaces.

The problem of parking a motor vehicle in a small space relative to the over all length of the motor vehicle is one that has vexed motor vehicle operators since the advent of such vehicles. It has been proposed to mount auxiliary wheels in various positions on the vehicle to permit movement of the vehicle laterally of its length as well as in the direction of its length. However, the proposed methods of mounting the auxiliary wheels have generally proved unsatisfactory from the standpoint of the strength of the device, which must be sufficient to support the full weight of the vehicle yet must not add an undue amount of weight thereto, and from the standpoint of the operation thereof, which must be simple and reliable, yet must not require expensive or complicated operating means. As a result of the drawbacks of previously proposed devices, parking devices of this nature have not come into general use.

It is an object of the present invention to provide a device having wheels thereon to be mounted beneath both the front and rear ends of a motor vehicle to facilitate movement of the vehicle in a direction laterally of its length which device overcomes the disadvantages of previous devices.

It is a further object of the present invention to provide a wheel device for mounting beneath the front and rear ends of a motor vehicle, which device may be lowered to raise the vehicle from its running wheels, and having means thereon to rotate the wheels of the device to move the vehicle laterally of its length.

It is a still further object of the present invention to provide a device for facilitating parking of a motor vehicle, which device may be mounted beneath the vehicle and which is strong and sturdy and which locks in the lowered position to prevent undue movement of the structural members of the device and collapse of the device.

Other and further objects of the invention will become apparent from the following specification taken together with the appended claims and the accompanying drawings in which:

Fig. 1 is a vehicle with a device according to the present invention mounted on the front and rear of the vehicle and shown in the lowered position;

Fig. 2 is a vehicle with a device according to the present invention mounted on the front and rear of the vehicle and shown in the raised position;

Fig. 3 is a side elevation of the device according to the invention in the raised position;

Fig. 4 is a plan view of the device taken on line 4—4 of Fig. 3;

Fig. 6 is an end elevation of the device as shown in Fig. 5;

Fig. 7 is a diagrammatic representation of the hydraulic system for raising and lowering the device; and Fig. 8 is a diagrammatic representation of the hydraulic system for driving the wheels thereon.

Figure 5:
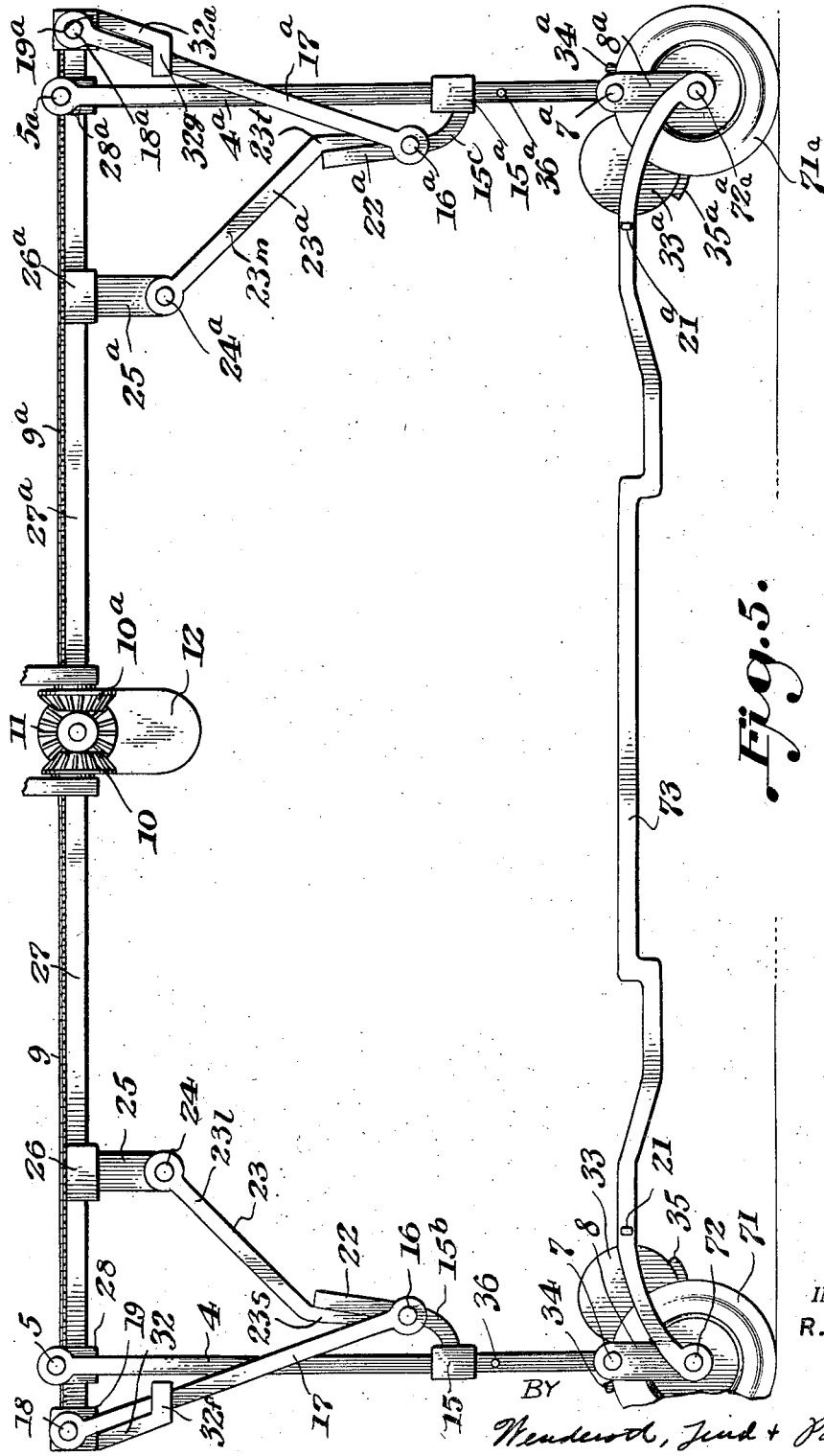
Fig. 5 is a side elevation of the device according to the invention in the lowered position.

As seen in the figures, a vehicle 1 having four vehicle wheels 2 and a chassis frame 3 has mounted beneath the front and rear ends a vehicle parking device according to the invention. Only one of the devices will be described, the other being identical thereto. Suspended from the chassis frame 3 by means of supporting rods 190 are two hangers 19 and two hangers 19a, the items designated by a being the counterpart of the elements designated by plain reference numerals but being located on the opposite end of the device from the elements designated by plain numerals. One of the hangers 19 and one of the hangers 19a are located adjacent the sides of the vehicle 1, while the remaining hanger 19 and the remaining hanger 19a are located near the central portion of the vehicle and are spaced from each other. Mounted beneath the hanger 19 toward the outside of the vehicle is bearing housing 30b and mounted beneath hangers 19a on the opposite side of the vehicle is bearing housing 30c. Beneath hangers 19 and 19a towards the center of the vehicle are mounted bearing housings 30 and 30a. Between the bearing housings 30 and 30b with the ends thereof rotatably mounted in bearings in said bearing housings is screw 9, and between bearing housings 30a and 30c with its ends likewise rotatably mounted in bearings in bearing housings 30a and 30c is screw 9a. Screws 9 and 9a are axially aligned and both are threaded in the same direction.

Spaced outwardly from the bearing housings are four hangers 31 and four hangers 31a mounted beneath hangers 19 and 19a on each side of the bearing 30, 30a, 30b and 30c. Mounted between the hangers 31 and 31a on the outside of the vehicle and hangers 31 and 31a towards the center of the vehicle are two rods 27 and two rods 27a, one rod on each side of the screws 9 and 9a.

Threaded onto screws 9 and 9a are nuts 6 and 6a. Rotatably mounted on the nuts are crosspieces 29 and 29a which extend outwardly on either side of the nuts 6 and 6a and through two bearing blocks 28 and two bearing blocks 28a slidably mounted on each of the rods 27 and 27a. Crosspieces 29 and 29a each end in cranks having axles 5 and 5a projecting outwardly parallel to the length of crosspieces 29 and 29a.

Pivoted to each end of the axles 5 and 5a are two tubular struts 4 and two tubular struts 4a. Pivoted to the ends of struts 4 and 4a by pivots 7 and 7a are frame members 8 and 8a which have mounted thereon axles 72 and 72a on which are rotatably mounted a pair of wheels 71 and a pair of wheels 71a. The tubular struts 4 and 4a together with the frame members 8 and 8a are of a length such that when the said struts and frame members are aligned in the vertical position beneath the chassis 3, they are long enough to raise the four vehicle wheels 2 off the ground.

Between the axles 72 and 72a are two parallel wheel spacing rods 73 and 73a on which are mounted the frame members 8 and 8a, and which are braced by cross spacing rods 21 and 21a which extend between the wheel spacing rods in a direction parallel to the axles 72 and 72a. The spacing rods and frame members form a wheel frame for supporting the axles 72 and 72a with wheels 71 and 71a. Between the struts 4 and 4a and spaced upwardly from the connections between the struts and the frame members 8 and 8a are strut reinforcing rods 36 and 36a.

Between the bearing blocks 28 and 28a and the hangers 31 and 31a on the inner ends of the rods 27 and 27a are two slide blocks 26 and two slide blocks 26a slidably mounted on the two rods 27 and two rods 27a. Projections 25 and 25a project downwardly from the slide blocks 26 and 26a. Between the lower ends of the projections 25 and 25a are mounted axles 24 and 24a. Pivoted to the ends of the axles 24 and 24a are two angularly bent arms 23 and two angularly bent arms 23a each with long portions 23l and 23m and short portions 23s and 23t joined at an angle to each other. The angularly bent arms are pivoted to the axles 24 and 24a at the ends of the longer portions 23l and 23m.

Slidably mounted on the two tubular struts 4 and the two tubular struts 4a are two sleeves 15 and two sleeves 15a. Sleeves 15 and 15a have upwardly curved projections 15b and 15c thereon. Axle 16 is rotatably mounted between the ends of the upwardly curved projections 15b, and axle 16a is rotatably mounted between the end of the upwardly curved projections 15c. The ends of the short portions of angularly bent arms 23 and 23a are pivoted to the axles 16 and 16a on the portions of axles 16 and 16a which extend between the projections 15b and 15c.

The ends of axles 16 and 16a project outwardly of the upwardly curved projections 15b and 15c. Hanger 19 at one end of the parking device has pivots 18 projecting outwardly therefrom, and hanger 19a at the other end of the device has pivots 18a projecting outwardly therefrom. Two arms 17 and two arms 17a are pivoted at one end on the pivots 18 and pivots 18a and on the other end to the projecting ends of the axles 16 and 16a.

From the upper ends of the two upwardly curved projections 15b and the two upwardly curved projections 15c extend two projections 22 and two projections 22a. Projections 22 and 22a are the same length as the shorter portions of angularly bent arms 23 and 23a. Between the ends of projections 22 is crosspiece 20 and between the ends of projections 22a is crosspiece 20a.

Two braces 32 extend downwardly from the outer hanger 19 and two braces 32a extend downwardly from outer hanger 19a, and each brace has a forked end 32f and 32g adapted to embrace one of the arms 17 or 17a.

Between the hangers 19 and 19a in the center of the device is mounted a hydraulic gear motor 12. Bevel gear 11 is rotated by the motor 12 and projects between the ends of the screws 9 and 9a. Bevel gears 10 and 10a are mounted on the ends of screws 9 and 9a and mesh with bevel gear 11.

Mounted on the frame formed by the rods 73 and 73a and cross spacing rods 21 and 21a and between the two wheels 1 and the two wheels 1a are mounted hydraulic gear motors 33 and 33a. These motors are geared to axles 72 and 72a. Hydraulic fluid pressure lines 34 and 34a lead to one side of the motors 33 and 33a and hydraulic fluid pressure lines 35 and 35a lead to the other side of the hydraulic motors 33 and 33a.

A hydraulic system by which the screws 9 and 9a are rotated and which may be mounted on the vehicle at any convenient location, is shown schematically in Fig. 7. The hydraulic gear motor 12 is supplied with hydraulic fluid under pressure from a hydraulic gear pump 80 through a supply pipe 87 with branches 87a and 87b to each side of the gear motor 12. The direction in which the fluid is fed to the hydraulic gear motor 12 is controlled by valve 82 in the output line from the pump 80, and valves 83 and 84 in the branches. A reservoir 81 is provided for the hydraulic fluid, and return line 88 with branches 88a and 88b connected to both sides of hydraulic gear motor 12 at valves 83 and 84 is connected into the reservoir. By-pass line 86 is provided between the valve 82 on the output line from the hydraulic pump 80 and the return line 88. Valve 82 permits diverting the fluid output of the hydraulic pump directly into the reservoir. Supply line 85 connects the reservoir to the intake side of the hydraulic pump 80. Motive power for the hydraulic pump 80 may be supplied by the auxiliary power system in the automotive vehicle.

The hydraulic system for operating the screws 9 and 9a has been illustrated as applied to the device mounted on one end of the vehicle. A second system may be tied into this system for operating the device on the other end of the vehicle. There has been illustrated branch lines 89 and 89a to which the duplicate hydraulic system may be attached.

The hydraulic system for operating the hydraulic gear motors 33 and 33a is illustrated in Fig. 8. A hydraulic gear pump 90 is supplied from reservoir 91 through line 95. Supply pipes 97 and 97a are connected to the hydraulic gear motors 33 and 33a from the output side of hydraulic gear pump 90 through hydraulic fluid pressure lines 34, 34a, 35 and 35a. Valves 92, 93, 93a, 94 and 94a control the direction in which the hydraulic fluid is pumped through the hydraulic gear motors 33 and 33a. Return lines 98 and 98a are provided with branches 98b and 98c connected to the hydraulic pressure lines 34, 34a, 35 and 35a at valves 93, 93a and 94 and 94a, the return lines leading directly into the reservoir 91. Blocking valves 99 and 99a are provided in the return lines 98 and 98a which serve to block the fluid from returning to the reservoir and thus block the hydraulic gear motors 33 and 33a. By-pass line 96 is provided between the output side of hydraulic gear pump 90 and the reservoir 91, and valve 92 is provided to divert the fluid output of the hydraulic gear pump 90 into the by-pass line 96. Duplicate systems may be attached to branch lines 100, 100a and 100b and 100c for operating the hydraulic gear motors on the device at the opposite end of the vehicle. As is the case with the hydraulic system for operating the hydraulic gear motor 12, power for operating the hydraulic gear pump 90 is provided from the auxiliary power system of the automotive vehicle, and the hydraulic system may be mounted at any convenient location on the vehicle.

In the operation of the device, the valve 82 is set to direct the fluid output of hydraulic gear pump 80 to the motor 12, and the valves 83 and 84 are set to direct the hydraulic fluid through gear motor 12 to rotate bevel gear 11. Bevel gears 10 and 10a are thus rotated, thereby rotating screws 9 and 9a. Rotation of the screws 9 and 9a causes the nuts 6 and 6a to move outwardly along the screws 9 and 9a, thus sliding bearing blocks 28 and 28a along rods 27 and 27a. Struts 4 and 4a, pivoted to the bearing blocks 28 and 28a through axles 5 and 5a cause the wheels 71 and 71a to be lowered vertically. The wheel spacing rods 73 maintain the wheels 71 and 71a in spaced relationship during the vertical movement thereof.

As the struts 4 and 4a lower the wheels 71 and 71a, the sleeves 15 and 15a slide downwardly on the struts 4 and 4a under the combined action of the arms 17 and 17a and the angularly bent arms 23 and 23a, which act on sleeves 15 and 15a through the curved projections 15b and 15c. Because of the length of angularly bent arms 23 and 23a, during the lowering of wheels 71 and 71a the slide blocks 26 and 26a are moved along the rods 27 and 27a.

The movement of the screws 9 and 9a, the bearing blocks 28 and 28a, the struts 4 and 4a and the arms 17 and 17a together with the angularly bent arms 23 and 23a continues until the struts 4 and 4a are in the vertical position as shown in Fig. 5. At this point the arms 17 and 17a engage the forked ends of braces 32 and 32a, and the crosspieces 20 and 20a engage the joint between the portions of angularly bent arms 23 and 23a. The bearing blocks 28 and 28a abut the hangers 31. The wheels 71 and 71a are then in the lowered position and as shown in Fig. 1 have raised the vehicle wheels 2 from the surface on which they are supported.

The valve 82 may then be turned to direct the fluid output of hydraulic gear pump 80 into the by-pass line 86.

In the lowered position, the linkages which have been described lock the four wheels 71 and 71a and lock the supporting struts 4 and 4a in the vertical position. The upper ends of struts 4 and 4a are held stationary by the screws 9 and 9a. Any force tending to urge the wheels 71 outwardly of the vehicle (to the left in Fig. 5) is resisted by the brace 32. Any force tending to urge the wheels 71 inwardly of the vehicle is resisted by the combination of the linkage causing the crosspiece 20 to bear against the angular joint between the portions of angularly bent arms 23. Further, since the wheels 71 are joined to wheels 71a through the wheel spacing rods 73 and 73a, the force tending to urge the wheels 71 inwardly of the vehicle will be resisted by the braces 32a which will brace struts 4a and consequently wheels 71a against movement outwardly from the vehicle.

There is thus provided a rigid supporting structure for supporting the vehicle for lateral movement relative to its longitudinal direction.

If it is desired to move the vehicle laterally on the wheels 71 and 71a, the valve 92 is set to direct hydraulic fluid into the supply lines 97 and 97a, and the valves 93 and 93a and 94 and 94a are set to direct the hydraulic fluid through the gear motors 33 and 33a in the direction in which it is desired to turn the wheels for movement in the desired direction. When the desired movement has been completed, valves 99 and 99a may be closed, thus blocking any further movement of the hydraulic gear motors 33 and 33a and effectively braking further movement of the vehicle. Opening valves 99 and 99a and reversing valves 93 and 93a, 94 and 94a causes the wheels 71 and 71a to rotate in the opposite direction for lateral movement in the opposite direction.

Once the desired position of the vehicle has been achieved, valves 83 and 84 are reversed, and valve 82 is again set to direct hydraulic fluid into hydraulic gear motor 12. Hydraulic gear motor 12 will be rotated in the opposite direction, thus causing screws 9 to rotate in the opposite direction and cause nuts 6 and 6a to move along screws 9 and 9a toward the center of the vehicle. This retracts wheels 71 and 71a to the position originally occupied.

Having thus disclosed the invention, what is claimed is:

1. A device for raising a wheeled vehicle from its wheels and mounted beneath at least one end of the wheeled vehicle, comprising two rotatable aligned screws, bevel gears on the opposed ends of said screws, a bevel gear meshed with the said bevel gears, means to rotate said bevel gear for driving said screws in opposite directions, a rod on each side of each screw parallel with said screws, a nut mounted on each screw, a bearing block slidably mounted on each of said rods, a crosspiece having cranks on the ends thereof rotatably mounted in each of said nuts and extending through the bearing blocks on the rods on each side of said screws, a tubular strut pivoted to each crank on the ends of each crosspiece, a wheel frame having wheel spacing rods extending the length of the device and cross spacing rods extending between the wheel spacing rods bracing them and having upright frame members at the four corners of said wheel frame to which said struts are pivoted, a wheel axle mounted at each end of said wheel frame, a wheel on each end of each wheel axle, a sleeve slidably mounted on each of said struts, an upwardly curved projection on each of said sleeves, an axle mounted between the ends of pairs of said upwardly curved projections parallel to the wheel axles, an angularly bent arm having a longer portion and a shorter portion pivoted to each end of each axle between the upwardly curved projections, a slide block slidably mounted on each rod between the end of the rod adjacent the bevel gears and the corresponding bearing block, a downward projection on each slide block to which the end of the longer portion of one of the angularly bent arms is pivoted, a further projection on the end of each of said upwardly curved projections of a length equal to the length of the shorter portion of said angularly bent arms, a crosspiece between the ends of pairs of said further projections, an arm pivoted to each end of each of said axles between pairs of said upwardly curved projections outside of the last mentioned said projections, the other ends of said last named arms being pivoted at the ends of said rods adjacent the ends of said screws opposite to the ends having the bevel gears thereon, a brace depending from the end of each of said rods adjacent the pivoted ends of said last named arms, each of said braces having a forked end for receiving therein one of said last named arms when said struts are in the vertical position, two hydraulic gear motors mounted on said wheel frame, one between each pair of wheels and geared to the corresponding one of said wheel axles, and means to drive said hydraulic gear motors for rotating said wheels.

2. A device for raising a wheeled vehicle from its wheels and mounted beneath at least one end of the wheeled vehicle, comprising two aligned screws, bevel gears on the opposed ends of said screws, means for driving said bevel gears and said screws in opposite directions, a rod on each side of each screw parallel with said screws, a nut mounted on each screw, a bearing block slidably mounted on each of said rods, a crosspiece rotatably mounted in each of said nuts and extending through the bearing blocks on the rods on each side of said screws, a tubular strut pivoted to the end of each crosspiece, a wheel frame having wheel spacing rods extending the length of the device and cross spacing rods extending between the wheel spacing rods bracing them and having upright frame members at the four corners of said wheel frame to which said struts are pivoted, a wheel axle mounted at each end of said wheel frame, a wheel on each end of each wheel axle, a sleeve slidably mounted on each of said struts, an upwardly curved projection on each of said sleeves, an axle mounted between the ends of pairs of said upwardly curved projections parallel to the wheel axles, an angularly bent arm having a longer portion and a shorter portion pivoted to each end of each axle between the upwardly curved projections, a slide block slidably mounted on each rod between the end of the rod adjacent the bevel gears and the corresponding bearing block to which the end of the longer portion of one of the angularly bent arms is pivoted, a further projection on the end of each of said upwardly curved projections of a length equal to the length of the shorter portion of said angularly bent arms, a crosspiece between the ends of pairs of said further projections, an arm pivoted to each end of each of said axles between pairs of said upwardly curved projections outside of the last mentioned said projections, the other ends of said last named arms being pivoted at the ends of said rods adjacent the ends of said screws opposite to the ends having the bevel gears thereon, a brace depending from the end of each of said rods adjacent the pivoted ends of said last named arms, each of said braces having a forked end for receiving therein one of said last named arms when said struts are in the vertical position, and means mounted on said wheel frame geared to said wheel axles for rotating said wheels.

3. A device for raising a wheeled vehicle from its wheels and mounted beneath at least one end of the wheeled vehicle, comprising two aligned screws, means for driving said screws in opposite directions, a nut mounted on each screw, a crosspiece rotatably mounted in each of said nuts, supporting means along which the ends of said crosspieces are slidable on each side of each of said screws, a tubular strut pivoted to each end of each crosspiece, a wheel frame extending the length of the device and having upright frame members at the four corners thereof to which said struts are pivoted, a wheel axle mounted at each end of said wheel frame, a wheel on each end of each wheel axle, a sleeve slidably mounted on each of said struts, an upwardly curved projection on each of said sleeves, an axle mounted between the ends of pairs of said upwardly curved projections parallel to the wheel axles, an angularly bent arm having a longer portion and a shorter portion pivoted to each end of each axle between the upwardly curved projections, the end of the longer portion of each of the angularly bent arms being slidably and pivotally connected to said supporting means for sliding movement thereon, a further projection on the end of each of said upwardly curved projections of a length equal to the length of the shorter portion of said angularly bent arms, a crosspiece between the ends of pairs of said further projections, an arm pivoted to each end of each of said axles between pairs of said upwardly curved projections outside of said further projections, the other ends of said last named arms being pivoted at the remote ends of said supporting means, and a brace depending from the end of each of said supporting means adjacent the pivoted ends of said last named arms, each of said braces having a forked end for receiving therein one of said last named arms when said struts are in the vertical position.

4. A device for raising a wheeled vehicle from its wheels and mounted beneath at least one end of the wheeled vehicle, comprising two aligned screws, means for driving said screws in opposite directions, a nut mounted on each screw, a crosspiece mounted in each of said nuts, supporting means along which the ends of said crosspieces are slidable on each side of each of said screws, a tubular strut pivoted to each end of each crosspiece, a wheel frame extending the length of said device and having upright frame members at the four corners thereof to which said struts are pivoted, a wheel axle mounted at each end of said wheel frame, a wheel on each end of each wheel axle, a sleeve slidably mounted on each of said struts, an upwardly extending projection on each of said sleeves, an axle mounted between the ends of pairs of said upwardly extending projections parallel to the wheel axles, an angularly bent arm having a longer portion and a shorter portion pivoted to each end of each axle between the upwardly extending projections, the end of the longer portion of each of the angularly bent arms being slidably and pivotally connected to said supporting means for sliding movement thereon, a further projection on the end of each of said upwardly extending projections of a length equal to the length of the shorter portion of said angularly bent arms, a crosspiece between the ends of pairs of said further projections, an arm pivoted to each end of each of said axles between pairs of said upwardly extending projections outside of said further projections, the other ends of said last named arms being pivoted at the remote ends of said supporting means, and a brace depending from the end of each of said supporting means adjacent the pivoted ends of said last named arms, each of said braces having a forked end for receiving therein one of said last named arms when said struts are in the vertical position.

5. A device for raising a wheeled vehicle from its wheels and mounted beneath at least one end of the wheeled vehicle, comprising two aligned screws, means for driving said screws in opposite directions, a nut mounted on each screw, a crosspiece mounted in each of said nuts, supporting means along which the ends of said crosspieces are slidable on each side of each of said screws, a tubular strut pivoted to each end of each crosspiece, a wheel frame extending the length of said device and having upright frame members at the four corners thereof to which said struts are pivoted, a wheel axle mounted at each end of said wheel frame, a wheel on each end of each wheel axle, a sleeve slidably mounted on each of said struts, an arm pivoted to each of said sleeves, the other ends of said arms being pivotally connected to said supporting means and a brace depending from the end of each of said supporting means adjacent the pivoted ends of said arms, each of said braces having a forked end for receiving therein one of said arms when said struts are in the vertical position.

6. In a device for raising a wheeled vehicle from its wheels mounted beneath at least one end of the wheeled vehicle, the device having two aligned screws, bevel gears on the opposed ends of said screws, means for driving said bevel gears and said screws in opposite directions, a rod on each side of each screw parallel with said screws, a nut mounted on each screw, a bearing block slidably mounted on each of said rods, a crosspiece rotatably mounted in each of said nuts and extending through a bearing block on the rods on each side of said screws, a tubular strut pivoted to the end of each crosspiece, a wheel frame having wheel spacing rods extending the length of the device and cross spacing rods extending between the wheel spacing rods bracing them and having upright frame members at the four corners of said wheel frame to which said struts are pivoted, a wheel axle mounted at each end of said wheel frame, and a wheel on each end of each wheel axle, that improvement comprising the combination of a sleeve slidably mounted on each of said struts, an upwardly curved projection on each of said sleeves, an axle mounted between the ends of pairs of said upwardly curvel projections parallel to the wheel axles, an angularly bent arm having a longer portion and a shorter portion pivoted to each end of each axle between the upwardly curved projections, a slide block slidably mounted on each rod between the end of the rod adjacent the bevel gears and the corresponding bearing block to which the end of the longer portion of one of the angularly bent arms is pivoted, a further projection on the end of each of said upwardly curved projections of a length equal to the length of the shorter portion of said angularly bent arms, a crosspiece between the ends of pairs of said further projections, an arm pivoted to each end of each of said axles between pairs of said upwardly curved projections outside of said further projections, the other ends of said last named arms being pivoted at the ends of said rods adjacent the ends of said screws opposite to the ends having the bevel gears thereon, and a brace depending from the end of each of said rods adjacent the pivoted ends of said last named arms, each of said braces having a forked end for receiving therein one of said last named arms when said struts are in the vertical position.

References Cited in the file of this patent
UNITED STATES PATENTS

| | | |
|---|---|---|
| 1,322,947 | Rapson | Nov. 25, 1919 |
| 1,699,031 | Sevault et al. | Jan. 15, 1929 |

FOREIGN PATENTS

| | | |
|---|---|---|
| 537,726 | Germany | Nov. 6, 1931 |
| 219,248 | Great Britain | July 24, 1924 |